Jan. 20, 1959  B. KRAUSE  2,869,283
PLANT POTTING MACHINE
Filed Oct. 17, 1955  5 Sheets-Sheet 2
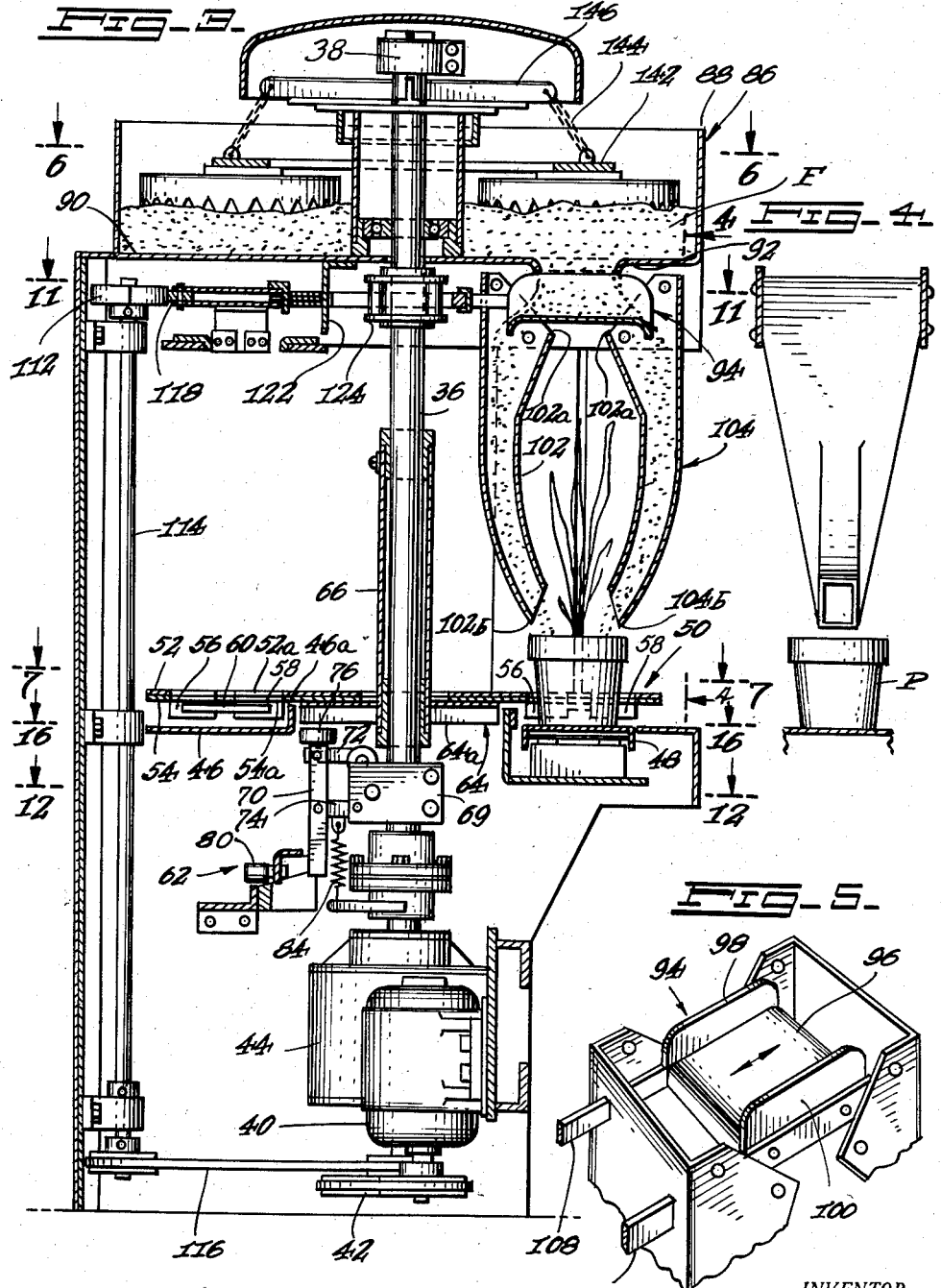
INVENTOR.
BRUNO KRAUSE.
BY Morton Amster
ATTORNEY.

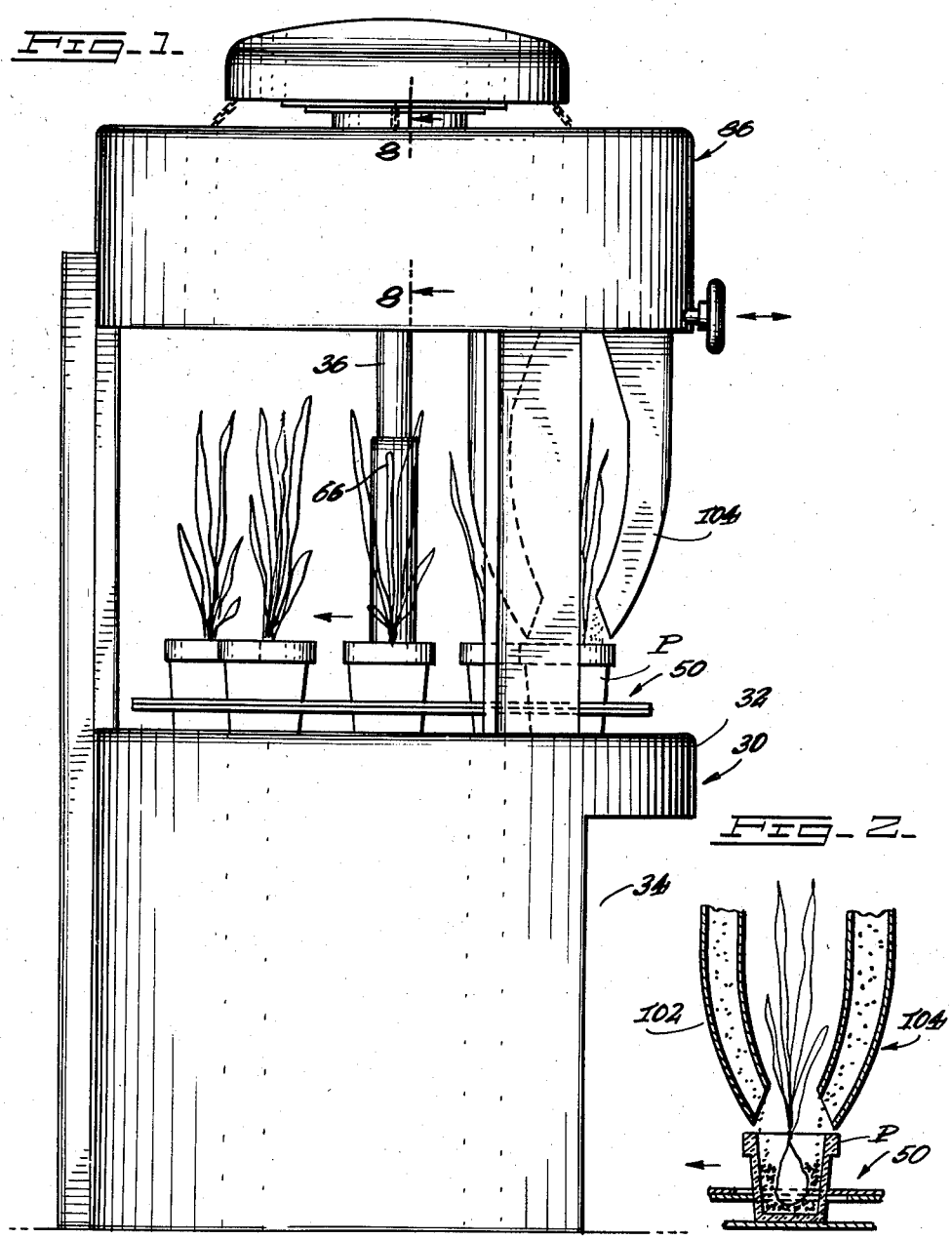

Jan. 20, 1959
B. KRAUSE
2,869,283
PLANT POTTING MACHINE
Filed Oct. 17, 1955
5 Sheets-Sheet 3
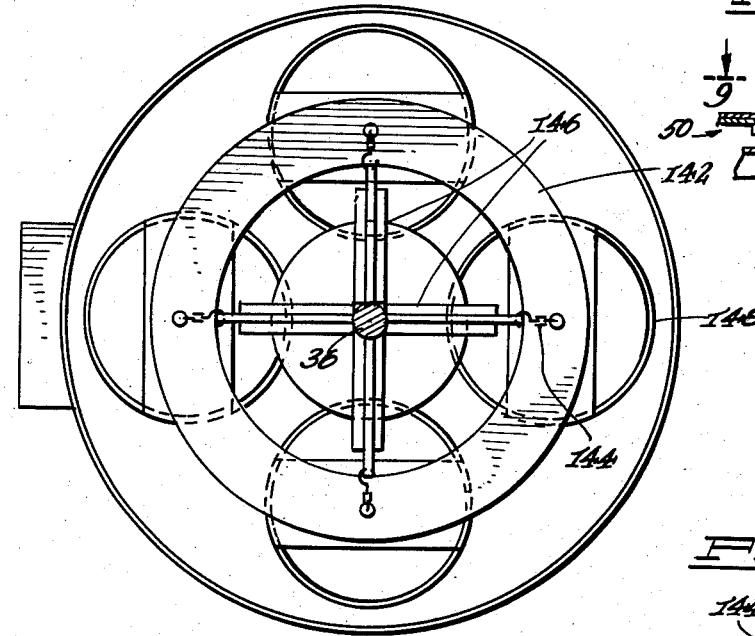
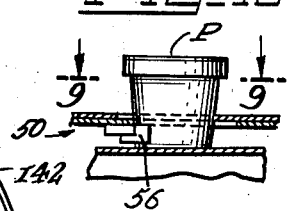
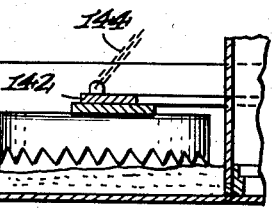
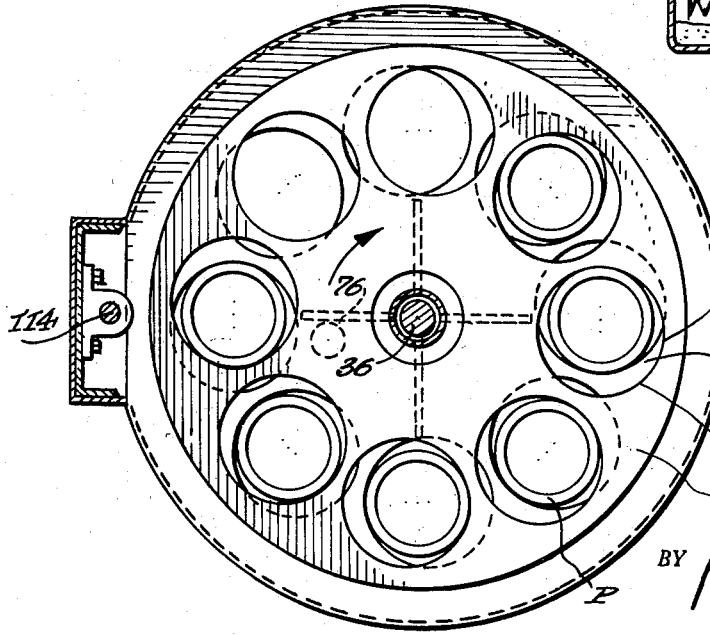
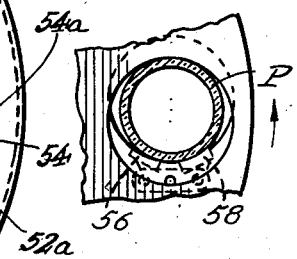
INVENTOR.
BRUNO KRAUSE,
BY Morton Ameter
ATTORNEY.

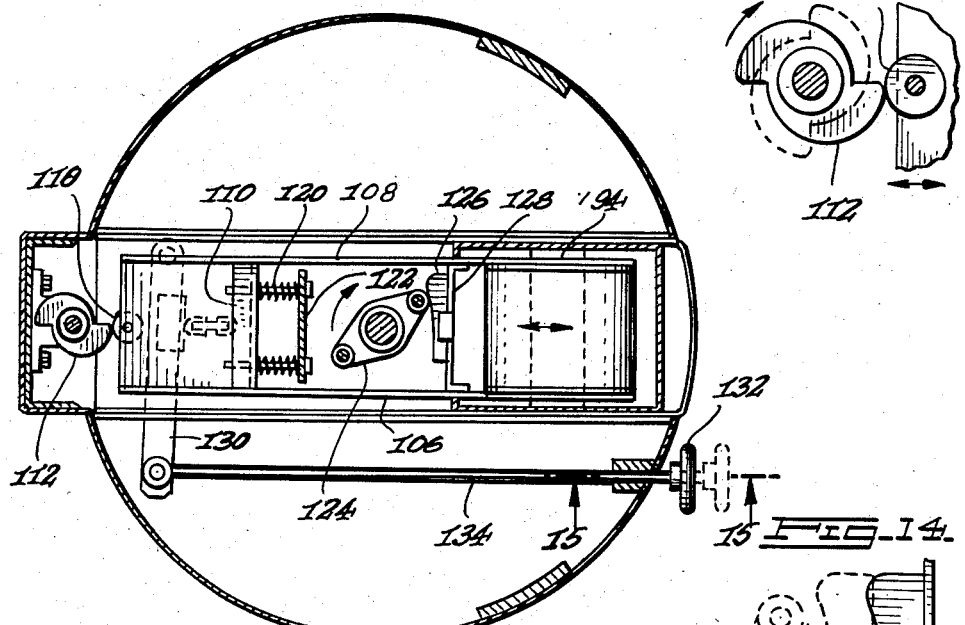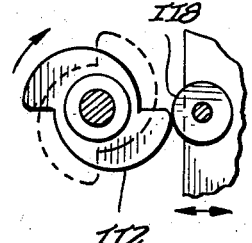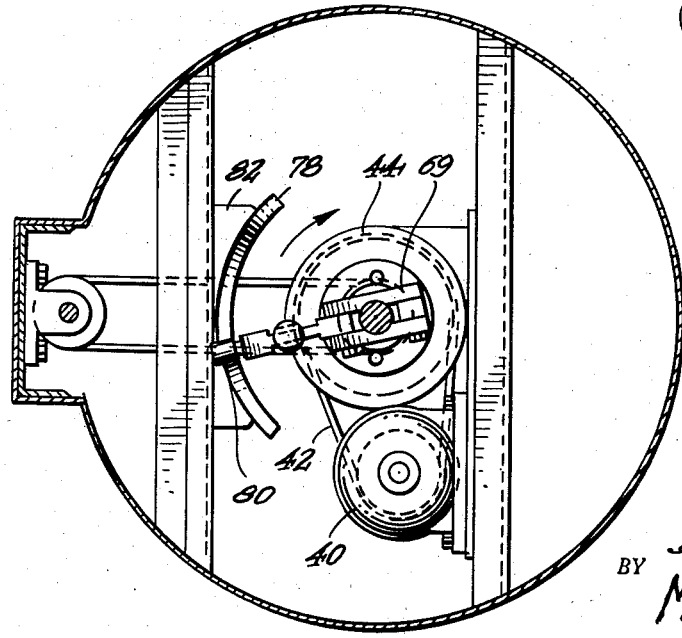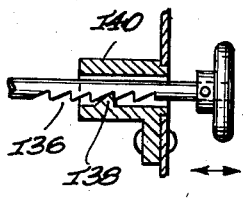

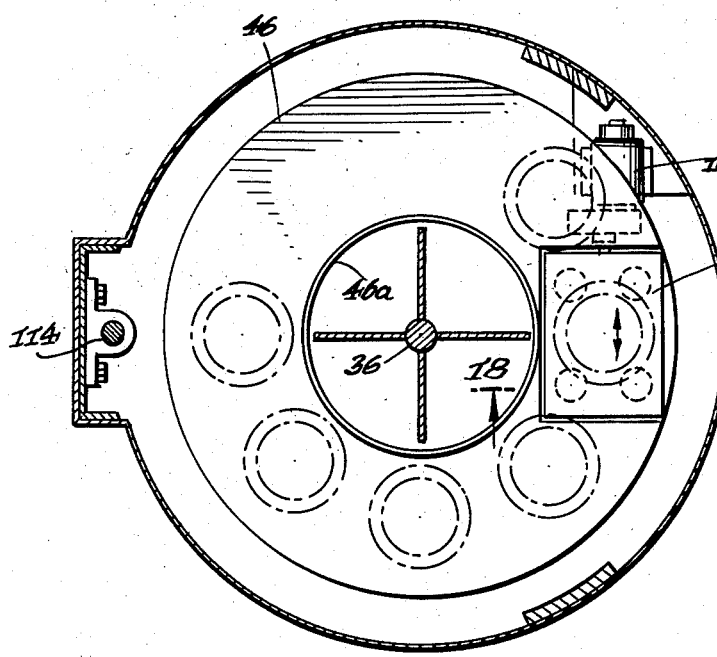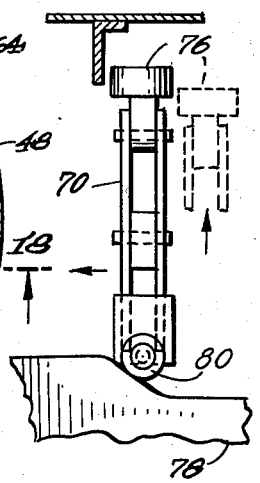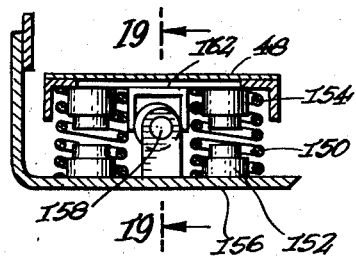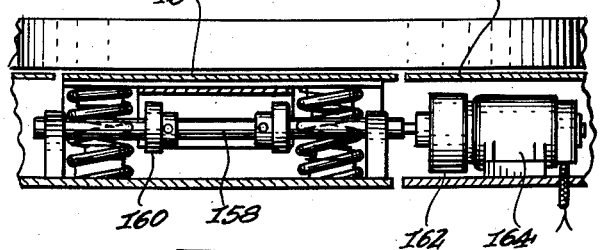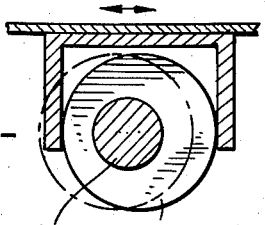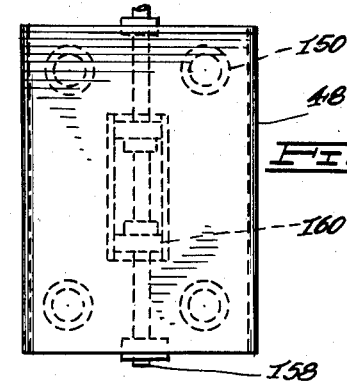
INVENTOR.
BRUNO KRAUSE.
BY Morton Amster
ATTORNEY.

United States Patent Office 2,869,283
Patented Jan. 20, 1959

2,869,283

PLANT POTTING MACHINE

Bruno Krause, Mannheim, Germany

Application October 17, 1955, Serial No. 540,687

9 Claims. (Cl. 47—1)

The present invention relates to a machine for loading material into a container, and in particular to semi-automatic mechanisms for loading predetermined quantities of a fill material into containers or pots, and for compacting the fill material about plant seedlings or cuttings manually placed in said containers or pots.

A number of machines are known for potting plants, seedlings, or cuttings on a semi-automatic or automatic basis. In such known machines a mass of wet earth is compressed about the plant or seedling into a ball in the shape of the pot and the ball is placed into the pot. These machines present a number of practical problems, both from the standpoint of the filling operations and from the ultimate viewpoint of proper plant growth.

Inherently, it is difficult to handle wet earth, especially when the moisture content varies and/or different fill materials are employed. For example, when attempting to pot plants with sandy soil additional water must be added to the fill material; when potting with clay-like soils, the fill material is usually too wet and must be allowed to dry out and/or additional dry materials added thereto. Further, the molding operation requires that the fill material be essentially free from stones which are likely to foul or jam the molding elements.

Apart from the obvious difficulties attendant to molding earth, the pots which receive the earth and the seedling are almost always fabricated of relatively fragile clay or ceramic and require special handling. Placing of the molded balls containing the plants or seedlings into the pots almost always requires manual handling to assure proper location of the mold in relation to the pot and avoid excessive breakage. When using potting mixtures which are exceptionally springy, such as vermiculite and/or peat moss, the molding operation is almost always unsuitable in that there is a tendency for the moisture to expand the mold after compression. Finally, known machines are not particularly adapted to handling a wide variety of horticultural and agricultural products without damaging the products during handling or subsequently inhibiting proper growth. The described compression techniques result in the formation of a compact, non-porous mass about the plants which does not allow air to reach the roots of the plants and necessarily interferes with the natural growing process.

It is an object of the present invention to provide a plant-potting machine which obviates one or more of the aforesaid difficulties. Specifically, it is within the contemplation of the present invention to provide mechanisms for the automatic filling of a pot with a predetermined charge of fill material while a plant is manually held in a desired position within the pot.

It is a further object of the present invention to provide automatic mechanisms for potting horicultural and agricultural products which function in a manner which precludes initial damage to the products and in no wise inhibits proper growth.

In accordance with an illustrative embodiment demonstrating features of the present invention, a plant-potting machine is provided having a continuous track extending substantially in a horizontal plane and including a shaker table arranged therealong with a pot-supporting surface lying in said plane. A conveyor is movable about the track and carries a plurality of pots disposed at circumferentially-spaced positions about the track. A feeding system is disposed above the shaker table and is arranged to deliver charges of fill to successive containers on the shaker table. The operation of the feeding system is coordinated to indexing of the conveyor such that feeding only occurs during the intervals between the indexing of the conveyor.

The above brief description and still further features, objects and advantages of the present invention will be more readily understood upon reference to the following detailed description of a presently preferred embodiment, when taken in conjunction with the accompanying drawings, wherein:

Fig. 1 is an elevational view of a plant-potting machine embodying features of the present invention;

Fig. 2 is a fragmentary elevational view showing the arrangement of the filling chutes in relation to a plant at the loading station;

Fig. 3 is a longitudinal section taken through the machine and showing the details of the various operating mechanisms;

Fig. 4 is a sectional view taken substantially along the lines 4—4 of Fig. 3 and looking in the direction of the arrows;

Fig. 5 is a fragmentary perspective view showing the arrangement of the vibrating feed plate which is intermittently operated to deliver the fill to the pot at the loading station;

Fig. 6 is a sectional view taken substantially along lines 6—6 of Fig. 3 and looking in the direction of the arrows showing the details of the storage bin and agitating means;

Fig. 7 is a sectional view taken along the lines 7—7 of Fig. 3 and looking in the direction of the arrows;

Fig. 8 is a fragmentary sectional view taken along the line 8—8 of Fig. 1 and looking in the direction of the arrows;

Fig. 9 is a fragmentary plan view of the indexing turret, taken substantially along the line 9—9 of Fig. 10;

Fig. 10 is a fragmentary elevational view showing the relationship of the indexing turret and the pot support or track;

Fig. 11 is a sectional view taken substantially along the line 11—11 of Fig. 3 and showing the details of the vibrating feed plate and the mechanisms associated therewith;

Fig. 12 is a sectional view taken substantially along the line 12—12 of Fig. 3 showing the details of the turret or carrier indexing mechanisms;

Fig. 13 is an enlarged fragmentary showing of the vibrator cam and follower for the feed plate;

Fig. 14 is an enlarged fragmentary plan view of the interrupter cam and follower for the feed plate;

Fig. 15 is a detail, with parts in section and taken along the line 15—15 of Fig. 11, showing the details of the control for adjusting the throw of the feed plate vibrator;

Fig. 16 is a sectional view taken substantially along the line 16—16 of Fig. 3 showing the details of the annular track and shaker table defining the feed path for the pots;

Fig. 17 is an enlarged elevation showing the cam-controlled mechanisms for indexing the turret or carrier;

Fig. 18 is an enlarged section along the line 18—18 of Fig. 16 showing the details of the shaker table or plate which supports successive pots at the loading station;

Fig. 19 is a sectional view taken substantially along the line 19—19 of Fig. 18;

Fig. 20 is a plan view of the shaker table or plate; and,

Fig. 21 is an enlarged section showing the details of the eccentric actuator for the shaker table.

Detailed reference will now be made to the drawings wherein there is shown a plant-potting machine, illustrating and demonstrating features of the present invention, which includes a base or frame 30 having a shroud or cover 32 relieved away at 34 to provide clearance for the operator's legs when seated at a position to the right of the machine, as in Figs. 1 and 3.

Extending vertically of the machine is a main drive shaft 36 which is journaled in appropriate bearings, such as 38, and is connected adjacent its lower end to a drive motor 40. In the illustrative form of the invention, the motor 40 is connected to the lower end of the main shaft 36 via a belt and pulley coupling 42 and a speed-reduction unit 44.

Disposed concentrically of the drive shaft 36 is an annular track 46 which extends horizontally at about table height and is easily accessible to the seated operator. The annular track 46 is provided with an upstanding flange 46a on its inner edge and serves as a support for the pots P in their circular movement about the machine. As seen best in Figs. 3 and 16, a horizontally-extending vibratory compacting table 48 forms part of the annular track 46 extending about the machine. By mechanisms to be subsequently described, successive pots are advanced about in a clockwise direction (when viewed in Fig. 16) to bring the pots one at a time onto the compacting table 48 and thence to unloading locations.

Arranged above the pot-supporting assembly, consisting of the support 46 and the table 48, is a horizontally-extending turret or carrier 50 through which successive pots P are inserted and by which the pots P are advanced stepwise about the track 46 and onto the compacting table 48. The turnable turret or carrier 50 includes a pair of plates or members 52, 54 arranged one above the other and in abutment which are formed with selectively registerable apertures 52a, 54a through which the pots are inserted. As may be best appreciated by inspecting Fig. 7, the effective opening of the seats defined by the openings 52a, 54a may be varied by changing the angular orientation of the plates 52, 54 with respect to each other.

Dependingly supported from the carrier 50, specifically from the lower plate 54 are abutment shoes 56, 58 which are pivotally supported on a common centrally-pivoted lever or arm 60. The shoes are disposed to engage the periphery of the pot P, as illustrated in Figs. 9 and 10, during clockwise rotation of the turret 50, for example as viewed in Fig. 7. It will be appreciated that the contact shoes 56, 58 will serve to positively advance the pots about a prescribed annular path upon turning of the carrier or turret 50 and to confine the respective pots against radial displacement from said prescribed path.

Actuating means, generally designated by the reference numeral 62, are coupled to the drive shaft 36 and periodically engage the turret 50 whereby the pots P may be advanced stepwise about the prescribed path. To this end, the turret 50 is supported on a spider-like support 64 including radially-extending arms 64a. The support 64 underlies and is connected to the lower turret plate 54 and the assembly in turn is loosely journaled on the drive shaft 36 through provision of an appropriate sleeve bearing 66. As seen best in Fig 12, a split clamp or bracket 69 is fixed to the main drive shaft 36 and carries thereon an upright coupling member 70. The member 70 is supported for up and down movement on the split bracket 69 by a parallelogram linkage 72, 74. At its upper end, the coupling member 70 carries a roller 76 which is engageable with the radial arms or ribs 64a when displaced upwardly into the general plane of the ribs.

When the roller 76 contacts one of the arms 64a, a driving connection is provided between the shaft 36 and the carrier 50 which driving connection includes the bracket 69 secured to the shaft 36 and the roller 76 engaged against the arms 64a of the spider or support 64.

The coupling member or actuating arm 70 is displaced upwardly into a position to provide the required driving connection at predetermined intervals during the cycle of the machine through provision of a cam and follower arrangement, including a cam track 78 which is a segment of a circle and a cam follower 80 in the form of a wheel or roller adapted to ride along the track 78. The track 78 is supported by a bracket 82 on the frame of the machine, while the cam follower 80 is fixed to and movable with the coupling member 70. The radial and vertical disposition of the track 78 is such that during each cycle of rotation the cam follower 80 is engaged upon the dwell portion of the cam track 78 and rides up to the rise portion whereupon the required driving connection is provided between the main shaft 36 and the turret 50. A suitable spring 84 is operatively connected to the parallelogram linkage 72, 74 to bias the cam follower and roller 76 into the down position, illustrated in Fig. 3. It will be appreciated that other intermittent indexing mechanisms may be employed for periodically coupling the carrier 50 to the drive shaft 36, such as the well known Geneva drive.

Spaced above the annular track 46 and the carrier 50 is a storage bin 86 which has an upper open end 88 and a floor 90. The storage bin 86 is supported on the frame of the machine and carries a quantity of fill material, designated by the letter F. At a location directly above the compacting table 48 the floor or bottom 90 of the storage bin 86 is provided with a discharge opening 92. Disposed immediately beneath the opening 92 is a feed plate 94 adapted for horizontal reciprocation by mechanisms to be described, the feed plate 94 including a floor or base 96 and upstanding side walls 98, 100. The bottom wall 96 is disposed immediately beneath the opening and is of larger lateral extent than the opening 92 and is effective to normally block the egress of fill material F from the opening 92 after a predetermined quantity has fallen onto the plate.

Conjoint reference will now be made to Figs. 3 and 11 wherein there is shown mechanisms for shaking the feed plate 94 back and forth across the opening 92, as indicated by the directional arrows on the feed plate, to cause the fill material F to drop off from the opposite curved ends of the floor or base 96. The fill which is dropped off from the feed plate 94 is delivered into the entry ends 102a, 104a of fill-delivery chutes 102, 104 which have their exit ends 102b, 104b directed toward successive pots arriving at the compacting table 48. By any appropriate structure, the spacing of the exit ends 102b, 104b of the chutes 102, 104 may be adjusted in relation to each other depending of course upon the size of the pots being handled by the machine. In the illustrative machine, the chutes are shown in fixed position relative to each other at a spacing suitable for handling pots of average size. As seen in Fig. 11, the feed plate 94 is supported on a frame which extends across the machine and includes arms 106, 108 slidably supported in a wall of the chute 102 and carrying there between a cross bar or head 110. The arms 106, 108, with their bearing contact with the chute 102, provide for initial adjustment of the plate 94 in relation to the opening 92. Additional slide bearings may be provided for the arms 106, 108, if required. The reciprocation of the assembly of the arms 106, 108 and the plate 94 supported thereby is achieved through provision of a rocker or shaker cam 112 supported at the upper end of a cam shaft 114. The shaft 114 extends vertically of the machine and is coupled at its lower end through an appropriate belt and pulley drive 116 to the output shaft of the motor 40. A cam follower 118 is supported between the arms 106, 108 by appropriate plates, the follower 118 being biased toward the cam 112 through provision of spring 120 supported on appropriate bolts connected between the cross head 110 and a fixed abutment 122 which is conveniently supported from the bottom wall 90 of the storage bin 86. When the cam 112 is in the position illustrated in Fig. 11, shown on an enlarged scale in Fig. 13, the plate 94 will be at the right end of its stroke with the spring 120 placed in compression; when the cam 112 moves toward the broken line position illustrated in Fig. 13, the biasing effect of the springs 120 will cause the follower and the plate 94 to move to left end of its reciprocatory movement. The cam development illustrated in Figs. 11 and 13 is appropriate to effect two shaking actions for each rotation of the cam shaft 114. Upon inspecting Fig. 3, it will be appreciated that the back and forth reciprocation of the plate 94 causes the fill material F to be delivered in alternation to the chutes 102, 104.

Appropriate means are operatively connected to the shaker plate 94 to periodically disengage the cam follower 118 from the cam 112 to interrupt the shaking or reciprocating movement which temporarily discontinues the feed of the fill material F. In the illustrative form of the invention, this structure includes an interrupter cam 124 fixed to the main drive shaft 36 and engageable with a cam follower 126 supported on a further cross head 128 carried between the arms 106, 108. As may be appreciated by inspecting Figs. 11 and 14, at a predetermined time in the machine cycle, the actuator or interrupter 124 is effective to displace the cam follower and the associated frame to the full line position of Fig. 14 wherein the cam follower 118 is beyond the rise portions of the cam 112. When the actuator 124 is in the broken line position of Fig. 14, the shaker mechanism again becomes effective. It will be appreciated that the cam shaft 114 is driven at a speed many times in excess of the main shaft 36 so that the feed plate may be vibrated at a fairly rapid rate to assure uniform delivery of the fill material. By proper coordination of the position of the actuator 124 in relation to the cam track and follower 78, 80 the delivery of fill material F is completely disrupted during indexing of the machine which corresponds to the time in the operating cycle during which a pot is not in position beneath the chutes 102, 104.

The initial position of the cam follower 118 in relation to the shaker cam 112 may be adjusted through provision of a cross head or lever 130 which is connected to an adjustment knob 132 by a coupling rod 134. As illustrated in Fig. 15, an appropriate notch and detent arrangement 136, 138 is provided respectively on the rod 134 and on a sleeve 140 whereby the assembly of the arms 106, 108 and the table 94 may be adjusted toward and away from the cam shaft 114. This adjustment changes the static bias on the springs 120 and provides an effective means for changing the throw, which is fixed and initially determined by the development of cam 112.

Within the bin 86 there is disposed appropriate means for spreading, distributing, and agitating the fill material F to assure a substantially uniform level of the same within the bin and to continuously deliver the fill material to a position over the discharge opening 92. The illustrative means, seen best in Figs. 3, 6 and 8, includes a ring-like plate or disk 142 dependingly supported by chains 144 which are carried on the radial arms of a spider 146 secured directly to the main shaft 36. At circumferentially-spaced locations of the plate 142, there are provided a number of inverted disc-like agitating members 148, each of which is provided with depending teeth. The supporting chains 144 are long enough to allow the agitating members 148 to follow the level of the fill material. Accordingly, in response to rotation of the shaft 36 the agitating members 148 will be continuously moved about the annular storage bin 86, bringing about redistribution of the fill material as the same falls through the discharge opening 92. It will be appreciated that the agitating means may take other forms than that illustrated.

Reference will now be made to Figs. 16 and 18 to 21 inclusive wherein there are shown the details of the mechanisms for bringing about reciprocation of the compacting table 48, as illustrated by the directional arrows in Fig. 16. As seen in Figs. 18 and 19 the compacting table 48 is supported on a spring bed including four coil springs 150 mounted between opposed studs 152, 154 secured respectively on the adjacent underlying frame part 156 and the undersurface of the table 48. Extending along the length of the table 48 is a shaft 158 which carries eccentrics 160 thereon which are engaged within a follower 162 secured to the under surface of the table 48. The eccentric shaft 158 is coupled through a suitable reduction gearing unit 162 to a motor 164 which drives the eccentric shaft 158. Rotation of the shaft 158 causes wobbling motion of the eccentrics 160 and side to side reciprocation of the compacting table 48. Due to the spring suspension for the table 48, this motion is more vibratory than side to side and is effective to cause the fill material coming into the pot on the table 48 to settle down about the plant or seedling held therein by the operator. In the illustrative form of the invention, the table 48 is continuously connected to the vibrating motor 164; however it is equally within the contemplation of the invention to employ an electrical or mechanical interrupting means for decoupling the table 48 from the motor 164 during the periods when successive pots are being advanced onto the table 48. In practice it has been found that the vibrating motion of the table 48 does not interfere with the movement of the pots onto and from the table 48.

In order to facilitate a more thorough understanding of the invention a typical cycle of operation will now be detailed:

Upon energization of the motor 40 the machine is placed in continuous operation. During an operating cycle, indexing of the turret 50 through the cam and follower 78, 80 brings a new pot onto the compacting table 48 which is continuously vibrating. When the new pot arrives on the table, the operator manually places the plant, cutting or seedling into the pot and holds the same in the desired position while the fill material is being delivered through the chutes 102, 104. As previously pointed out, fill material is not delivered to the chutes 102, 104 until the indexing is completed and by proper coordination of the respective cam controls, it is possible to have a slight delay after the pot comes into the filling station before the dirt or similar charge is delivered to the pot. The filling operation is continued for an interval determined by the speed of rotation of the shaft 36 and until the cam follower 80 again begins its run up on the track 78. The amount of fill material delivered of course can be varied by changing the speed or rotation of the shaft 36 and/or by adjusting the shaking motion applied to the feed plate 94. At a time prior to or substantially in unison with indexing of the machine, the interrupter cam 124 is effective to decouple the feed plate from the vibrator cam 112 whereby the plate no longer delivers the fill material to the chutes and effectively blocks the discharge aperture or opening 92. During the entire cycle of operation the agitating raking members 148 maintain the fill material at a substantially uniform level, the slack in the chain suspension for the rake members premitting the rakes to follow the level of fill material.

From the detailed description of a typical machine according to the present invention, it will be appreciated that a wide variety of fill materials may be employed, without the necessity of precautions to avoid stones in the fill material and without control over the moisture content of the fill material. The described mechanisms are positive acting, relatively simple, and minimize the possibility of fouling or jamming during normal operating conditions. Still further, the controlled gravity feed of the fill material with simultaneous vibration of the pot provides for a firm yet porous mass of fill about the plant or seedling yet which supplies the required support for the plant or seedling without inhibiting plant growth.

Although a presently preferred form of the invention has been described, it is to be expressly understood that numerous modifications may be made without departing from the spirit and scope of the invention and set forth in the appended claims.

What I claim is:

1. A plant-potting machine comprising an annular track extending substantially in a horizontal plane, a shaker table arranged along said track and including a pot-supporting surface lying substantially in said horizontal plane, a conveyor movable about said annular track and carrying a plurality of pots at circumferentially-spaced positions about said annular track, means operatively connected to said conveyor for intermittently indexing said conveyor to advance successive pots onto said shaker table, feed means above said shaker table and adapted to deliver a charge of fill to successive containers on said shaker table, and means for actuating said feed means in the intervals between indexing of said conveyor.

2. A plant-potting machine comprising a continuous annular track extending substantially in a horizontal plane, a shaker table arranged along said track and including a pot-supporting surface lying substantially in said horizontal plane, a conveyor movable about said annular track and carrying a plurality of pots at circumferentially-spaced positions about said track, means operatively connected to said conveyor for intermittently indexing said conveyor to advance successive pots onto said shaker table, feed means adapted to deliver a charge of fill to successive containers on said shaker table, and means for actuating said feed means in the intervals between indexing of said conveyor.

3. A plant-potting machine comprising an annular track extending substantially in a horizontal plane, a shaker table arranged along said track and including a pot-supporting surface lying substantially in said horizontal plane, a conveyor movable about said annular track and carrying a plurality of pots at circumferentially-spaced positions about said track, means operatively connected to said conveyor for intermittently indexing said conveyor to advance successive pots onto said shaker table, feed means above said shaker table and adapted to deliver a charge of fill to successive containers on said shaker table, means for actuating said feed means in the intervals between indexing of said conveyor, and means for continuously vibrating said shaker table.

4. In a plant-potting machine, an annular track along with successive pots are to be advanced, a vibratory compacting table forming part of said annular track, a turret rotatable about an axis concentric with the axis of said annular track for advancing successive pots onto said compacting table, actuating means periodically operative to turn said turret and to advance said pots stepwise along said annular track, a storage bin spaced above said annular track adapted to contain fill material, said storage bin including a floor provided with a discharge opening, fill-delivery chutes including entry ends at opposite sides of said feed plate and exit ends over said compacting table, means operatively connected to said feed plate for shaking the same from side to side to cause the fill on said feed plate to fall into said chutes, and means for interrupting the means for shaking said feed plate during the period of stepwise advance of said turret.

5. In a plant-potting machine, a track along which successive pots are to be advanced, a compacting table forming part of said track, means for vibrating said compacting table, a turret rotatable about an axis concentric with the axis of said track for advancing successive pots onto said compacting table, actuating means periodically operative to turn said turret and to advance said pots stepwise along said annular track, a storage bin spaced above said annular track adapted to contain fill material, said storage bin including a floor provided with a discharge opening, a feed plate disposed below and blocking said discharge opening, fill-delivery chutes including entry ends at opposite sides of said feed plate and exit ends converging over said compacting table, and means operatively connected to said feed plate for shaking the same from side to side to cause the fill on said feed plate to fall into said chutes.

6. In a plant-potting machine, a vertically-extending drive shaft, an annular track arranged concentrically of said drive shaft and about which successive pots are to be advanced, a horizontally-extending vibratory compacting table forming part of said annular track, a turret turnable about said main drive shaft for advancing successive pots onto said compacting table, actuating means coupled to said drive shaft and periodically engageable with said turret whereby said pots are advanced stepwise along with said annular track, a storage bin spaced above said annular track adapted to contain fill material, said storage bin including a floor provided with a discharge opening, agitating means driven from said drive shaft and effective to direct fill material toward said discharge opening, a horizontally-disposed feed plate below said discharge opening, fill-delivery chutes including entry ends at opposite sides of said feed plate and exit ends over said compacting table, means operatively connected to said feed plate for shaking the same from side to side to cause the fill on said feed plate to fall into said chutes, and means operatively connected to said drive shaft for interrupting the means for shaking said feed plate during the period of stepwise advance of said turret.

7. In a plant-potting machine, a vertically-extending drive shaft, an annular track arranged concentrically of said drive shaft and about which successive pots are to be advanced, a horizontally-extending vibratory compacting table forming part of said annular track, a turret turnable about said main drive shaft for advancing successive pots onto said compacting table, actuating means coupled to said drive shaft and periodically engageable with said turret whereby said pots are advanced stepwise along said annular track, a storage bin spaced above said annular track adapted to contain fill material, said storage bin including a floor provided with a discharge opening, a horizontally-disposed feed plate below said discharge opening, fill-delivery chutes including entry ends at opposite sides of said feed plate and exit ends over said compacting table, means operatively connected to said feed plate for shaking the same from side to side to cause the fill on said feed plate to fall into said chutes, and means operatively connected to said drive shaft for interrupting the means for shaking said feed plate during the period of stepwise advance of said turret.

8. A plant-potting machine comprising an annular track extending substantially in a horizontal plane, a shaker table arranged along said track and extending substantially in said horizontal plane, a conveyor movable about said annular track and adapted to carry a plurality of pots at circumferentially-spaced positions about said annular track, means operatively connected to said conveyor for indexing said conveyor to advance successive pots onto said shaker table, feed means above said shaker table and adapted to deliver a charge of fill to successive containers on said shaker table, and means operatively connected to said feed means for periodically actuating said feed means to deliver a charge of fill to successive containers.

9. In a plant-potting machine, an annular track along which successive pots are to be advanced, a vibratory compacting table forming part of said annular track, a turret rotatable about an axis concentric with the axis of said anular track for advancing successive pots onto said compacting table, actuating means operative to turn said turret and to advance said pots along said annular track, a storage bin spaced above said annular track adapted to contain fill material, said storage bin including a floor provided with a discharge opening, a feed plate disposed below and bridging said discharge opening, at least one fill-delivery chute including an entry end adjacent said feed plate and an exit end over said compacting table, means operatively connected to said feed plate for shaking the same from side to side to cause the fill on said feed plate to fall into said chute, and means for periodically interrupting the means for shaking said feed plate whereby said turret may be advanced without delivery of fill material.

References Cited in the file of this patent

UNITED STATES PATENTS

| | | |
|---|---|---|
| 1,154,665 | Small | Sept. 28, 1915 |
| 1,831,176 | Holm-Hansen | Nov. 10, 1931 |
| 2,328,401 | Stover | Aug. 31, 1943 |
| 2,415,528 | Peebles | Feb. 11, 1947 |

FOREIGN PATENTS

| | | |
|---|---|---|
| 819,331 | Germany | Oct. 31, 1951 |
| 599,962 | Great Britain | Mar. 24, 1948 |